A. LANDAU.
DRY BATTERY.
APPLICATION FILED AUG. 28, 1915.
1,199,390. Patented Sept. 26, 1916.
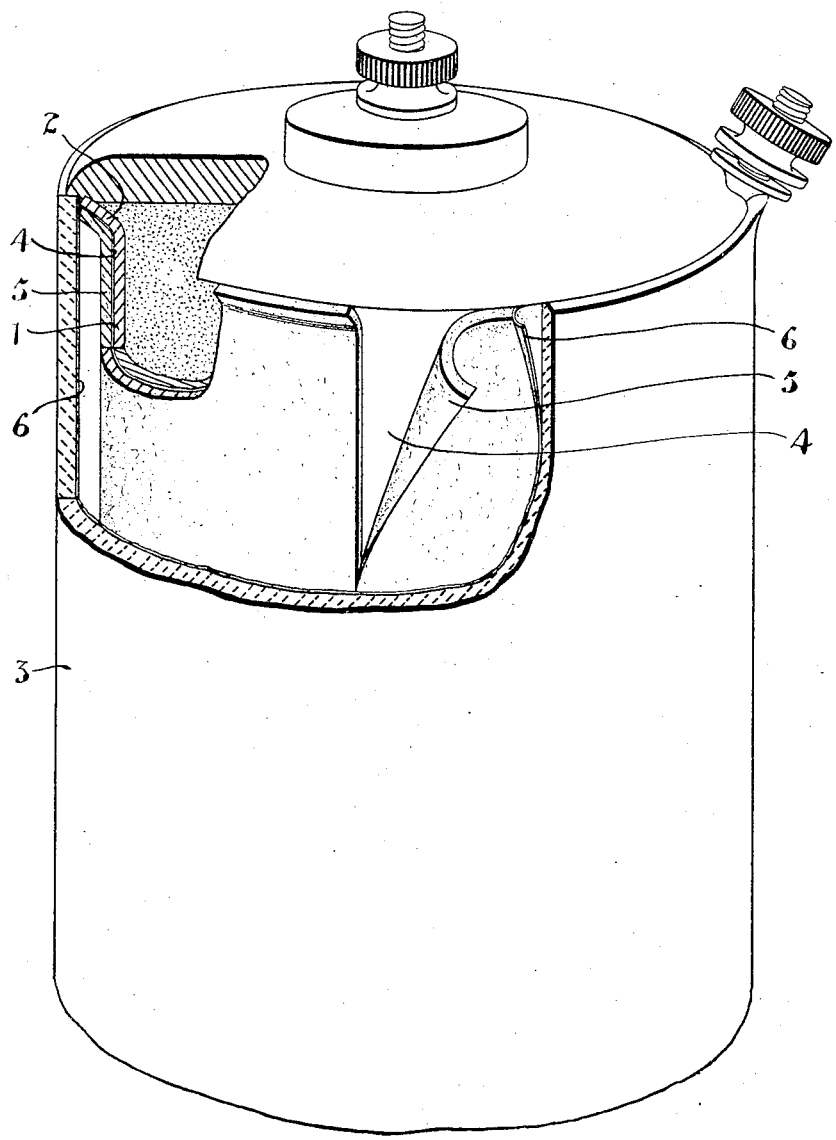
Inventor.
Alfred Landau
by H. J. S. Dennison
Atty.

UNITED STATES PATENT OFFICE.

ALFRED LANDAU, OF TORONTO, ONTARIO, CANADA, ASSIGNOR TO UNITED BATTERY CORPORATION, OF BROOKLYN, NEW YORK, A CORPORATION OF NEW YORK.

DRY BATTERY.

1,199,390.  Specification of Letters Patent.  Patented Sept. 26, 1916.

Application filed August 28, 1915. Serial No. 47,731.

*To all whom it may concern:*

Be it known that I, ALFRED LANDAU, a subject of the King of Great Britain, and resident of the city of Toronto, county of York, Province of Ontario, in the Dominion of Canada, have invented certain new and useful Improvements in Dry Batteries, described in the following specification and illustrated in the accompanying drawings, that form part of the same.

The principal objects of the invention are to obviate the difficulties incident to atmospheric and temperature influence upon batteries of this class and to insulate the active part of the battery in such manner as to minimize the retarding effect upon the electrolyte due to low temperatures and to restrain the violent chemical action caused by extremely high temperatures. It is well known that dry batteries decrease in efficiency through age and this is mostly due to excitation caused by the transference of energy between the negative and positive poles, this being principally due to superfluous moisture in the atmosphere affecting the zinc container.

An important feature of the present invention consists in the novel formation of the cell and the arrangement and construction of a covering thereon whereby the cell is insulated against the effect of changes in atmospheric conditions.

As illustrating a manner in which the invention may be realized, reference is made to the drawing forming a part of this specification, in which drawing there is a sectional-perspective view of a battery or cell that embodies the invention.

In said battery or cell the zinc container 1 is formed with an outwardly flaring upper edge 2. This flaring edge is adapted to engage the upper edge of the outside container 3 which is formed of fibrous material and the inner member or inner container 1 is thus spaced centrally within the outer container with a surrounding dead air space. Prior to the insertion of the zinc container within the outer container the surface of the said inner container is coated with a suitable adhesive varnish which is impervious to moisture, thus forming an insulating coating 4. A jacket 5 formed of a sheet of asbestos or similar heat insulating material is placed around the zinc container while the varnish coat is still sticky thus providing a protecting covering which is a poor conductor of heat, consequently the cell retains a comparatively uniform temperature, outside changes of temperature affecting it but slowly. The electrolytic paste and the depolarizing compound inside of the cell are thus protected to a very great extent against atmospheric changes. The outside container 3 is covered or lined on its inner wall with a layer 6 of moisture resisting material such as paraffined paper or the inner surface may be coated with paraffin or similar waterproof material. When the inner container is placed within the external cover or outer container the top is sealed so that the sealing wax extends over the top of the flanged zinc container, thus effectively closing the air space surrounding the inner container and consequently forming an insulating jacket which is very efficient against changes in temperature. The seal extending beyond the top edge of the inner container effectively secures the outer casing to the inner member and thus forms a unit from which the outer cover cannot be removed and replaced in a fraudulent manner. The feature of incasing the cell proper within an outer container spaced therefrom and extending the seal to the outer container is also important in multiple cell units, that is, where two or more cells are grouped together in one container.

What I claim as my invention is:—

1. A dry battery comprising a zinc container coated with a waterproof insulating cement, a jacket of heat insulating material in sheet form placed around the zinc container while the cement was in a sticky condition, and an outer container of fibrous material which is coated with waterproof material on its inner side only.

2. A battery comprising a dry cell having a zinc container, a casing surrounding and spaced from said zinc container, and sealing material overlying the top of said cell, which sealing material extends past the upper edge of the zinc container and effects a tight joint with the upper portion of the outer container thereby inclosing a dead air-space between the zinc container and said casing.

3. In a dry battery, a cell having a metallic container formed with its side walls flaring outwardly at the top, an outer container surrounding said metallic container and having its inner wall engaging the outwardly flaring edge of the metallic container, and a seal covering the top of said cell and extending to the top of the outer container, the outwardly flaring portion of the metallic container serving to space the outer container and the cell whereby an inclosed dead air-space will be provided between the containers.

4. In a dry battery, in combination an outer container of fibrous material having a coating of waterproof material, a cell arranged within said container which cell has a metallic container that is spaced from the side walls of the outer container, and a seal covering the top of said cell and extending from the top of said metallic container to the outer container whereby there will be inclosed a dead air-space around the cell between the containers.

5. In a dry battery, in combination a metallic-cased cell having an insulating adhesive coating, a jacket of heat insulating material secured to said adhesive coating and surrounding the cell, an outer container of fibrous material having a coating of waterproof material, which outer container is spaced from said insulating jacket, and a seal covering the top of said cell and extending to said outer container so as to provide a tight joint whereby there will be inclosed an annular dead air-space around the cell.

6. A dry battery having a container of fibrous material and a cell within said container, which container has waterproof material covering its inner wall, there being no waterproof material on its exterior wall.

7. In a dry battery in combination a metal cased cell having an insulating adhesive coating, a jacket of heat insulating material secured to said adhesive coating and surrounding the cell, an outer container of fibrous material spaced from said insulating jacket, and a seal closing the top of said cell and container and inclosing a dead air space around the cell.

8. In a dry battery, a container of fibrous material having a waterproof material coating its inner wall only and a cell arranged within said container.

9. In combination in a dry battery, a cell having a metallic container, and an outer container the inner surface only of which is coated with a waterproof material, said battery also having a seal which covers the cell and extends to and makes a tight joint with the upper end of the outer container.

10. A dry battery comprising in combination a cell having a metallic container, an outer container which surrounds said metallic container, and a seal covering the cell and extending to the upper end of the outer container, there being a dead air-space between said containers surrounding said cell.

11. In a dry battery in combination with a metal-cased cell, an outer container of fibrous material spaced around said cell, and a seal closing the top of said cell and container, there being left a dead air space between said cell and said outer container.

12. In a dry battery in combination with a metal-cased cell, an outer container of fibrous material spaced from said cell, and a seal closing the top of said cell and container and inclosing a dead air-space around said cell.

13. In a dry battery in combination with a metal-cased cell, an outer container of fibrous material spaced from said cell, and a seal closing the top of said cell and container and inclosing a dead air-space around said cell, said outer container being provided with a waterproof coating on its inner surface.

ALFRED LANDAU.